United States Patent
Kim

(10) Patent No.: US 10,046,622 B2
(45) Date of Patent: Aug. 14, 2018

(54) DOOR CURTAIN ASSEMBLY CAPABLE OF ADJUSTING SHADING AMOUNT

(71) Applicant: Hyundai Motor Company, Seoul (KR)

(72) Inventor: Do-Won Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/362,523

(22) Filed: Nov. 28, 2016

(65) Prior Publication Data

US 2018/0072138 A1    Mar. 15, 2018

(30) Foreign Application Priority Data

Sep. 12, 2016  (KR) .................. 10-2016-0117289

(51) Int. Cl.
  *B60J 1/20*   (2006.01)
  *E06B 9/24*   (2006.01)

(52) U.S. Cl.
  CPC ..... B60J 1/2086 (2013.01); *E06B 2009/2405* (2013.01); *E06B 2009/2452* (2013.01)

(58) Field of Classification Search
  CPC ............ B60J 1/2086; B60J 1/2069; E06B 2009/2405; E06B 2009/2452; E06B 2009/2458
  USPC ........................................... 160/85, 86, 120
  See application file for complete search history.

(56) References Cited

U.S. PATENT DOCUMENTS

| | | | | |
|---|---|---|---|---|
| 2,336,692 A | * | 12/1943 | Lubetsky | ............... A47H 23/06 160/120 |
| 3,183,033 A | * | 5/1965 | Stulbach | ............... B60J 1/2063 160/120 |
| 5,538,065 A | * | 7/1996 | G eraud | ................ A47H 23/06 160/120 |
| 6,189,592 B1 | * | 2/2001 | Domel | ..................... E06B 9/24 160/241 |
| 9,249,620 B2 | * | 2/2016 | Kim | ....................... E06B 9/264 |
| 2002/0030379 A1 | | 3/2002 | Sturt et al. | |
| 2002/0059986 A1 | * | 5/2002 | Schlecht | ............... B60J 1/2027 160/120 |
| 2004/0041433 A1 | | 3/2004 | Sturt et al. | |

FOREIGN PATENT DOCUMENTS

| | | |
|---|---|---|
| CN | 201729048 U | 2/2011 |
| DE | 102007001735 A1 * | 7/2008 |
| JP | 9-67984 A | 3/1997 |
| JP | 10-258637 A | 9/1998 |
| JP | 2009-96350 A | 5/2009 |
| KR | 20-0196765 Y1 | 7/2000 |
| KR | 20-0271133 Y1 | 4/2002 |
| KR | 10-0866344 B1 | 10/2008 |
| KR | 10-1357736 B1 | 2/2014 |

* cited by examiner

*Primary Examiner* — Blair M Johnson

(74) *Attorney, Agent, or Firm* — Morgan, Lewis & Bockius LLP

(57) ABSTRACT

A door curtain assembly configured for adjusting shading amount may include a fixed curtain wound around a fixed curtain take-up roll mounted at a door trim, a variable curtain wound around a variable curtain take-up roll mounted at the door trim, and a shade bar coupled to both a first end of the fixed curtain and a first end of the variable curtain such that the fixed curtain and the variable curtain are unwound and pulled up when the shade bar moves upward, wherein an upward position of the variable curtain can be adjusted.

4 Claims, 4 Drawing Sheets

DOOR CURTAIN ASSEMBLY CAPABLE OF ADJUSTING SHADING AMOUNT

CROSS-REFERENCE(S) TO RELATED APPLICATIONS

The present application claims priority to Korean Patent Application No. 10-2016-0117289, filed on Sep. 12, 2016, the entire contents of which is incorporated herein for all purposes by this reference.

BACKGROUND OF THE INVENTION

Field of the Invention

The present invention relates to a door curtain assembly for shading light entering into the inside of a vehicle through a door of the vehicle, and more particularly to a door curtain assembly capable of adjusting shading amount.

Description of Related Art

Vehicles are equipped with door glasses as well as front and rear windshields to see the outside and also allow to see the inside of the vehicle from the outside.

However, because of light excessively entering into the inside of the vehicle through door glasses in spring or summer, occupants feel inconvenience, temperature of the inside of the vehicle is increased and, if ultraviolet index is high, exposure to the light for a long time is harmful for health as well.

As such, users want to block out the light entering through windows as necessary and it is even more so in case of side window glasses.

In order to dissolve such inconvenience, there has been developed a door curtain in a variety of ways.

A typical door curtain is of a type that a door curtain wound around a take-up roll provided in a door trim is pulled upward by means of a knob and then it is hang on a hook provided in the door frame so that light entering through a window glass is blocked out.

However, although such a conventional door curtain can block out the light entering into the vehicle through glasses of the vehicle, it is capable of only blocking out the light entering through the glasses completely and allowing users who do not want to block out the light completely to select only opening the door curtain again in such a manner that shading is not made at all.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a door curtain assembly facilitating users to apply shading amount in a selective manner.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, various aspects of the present invention are directed to providing a door curtain assembly configured for adjusting shading amount, including a fixed curtain wound around a take-up roll for the fixed curtain (hereinafter, referred to as "fixed curtain take-up roll) mounted at a door trim; a variable curtain wound around a take-up roll for the variable curtain (hereinafter, referred to as "variable curtain take-up roll) mounted at the door trim; and a shade bar coupled to both a first end of the fixed curtain and a first end of the variable curtain such that the fixed curtain and the variable curtain are unwound and pulled up when the shade bar moves upward, wherein an upward position of the variable curtain can be adjusted.

The fixed curtain and the variable curtain are formed respectively as a double structure in which a mesh portion allowing light to pass therethrough and a shading portion for shading light are formed alternately one after another.

Furthermore, the mesh portion of the fixed curtain and the mesh portion of the variable curtain have a same width while the shading portion of the fixed curtain and the shading portion of the variable curtain have a same width.

Furthermore, the shade bar is configured for moving upward and then being locked to a door frame.

In this case, the shading portion of the fixed curtain and the mesh portion of the variable curtain are overlapped with each other when the fixed curtain and the variable curtain are unwound completely from the fixed curtain take-up roll and the variable curtain take-up roll respectively and then the shade bar is locked to the door frame.

Furthermore, an upward height of the variable curtain is adjustable such that the mesh portion of the fixed curtain and the mesh portion of the variable curtain are overlapped with each other.

To this end, the door curtain assembly further includes a control switch for adjusting the upward height of the variable curtain wherein the variable curtain is wound around the variable curtain take-up roll by manipulation of the control switch so that the upward height of the variable curtain is adjusted.

Furthermore, a first end of the variable curtain is supported elastically in the upward direction by a resilient roll provided on the shade bar wherein the variable curtain can be pulled downward by a predetermined length by manipulations of the control switch so that the upward height of the variable curtain is adjusted.

Therefore, the mesh portion of the variable curtain pulled downward by the predetermined length can be overlapped with the mesh portion of the fixed curtain.

In accordance with an alternative aspect of the present invention, the mesh portion of the fixed curtain and the mesh portion of the variable curtain are overlapped with each other when the fixed curtain and the variable curtain are unwound completely from the fixed curtain take-up roll and the variable curtain take-up roll respectively and then the shade bar is locked to the door frame.

To this end, the door curtain assembly further includes a control switch for adjusting the upward height of the variable curtain wherein the variable curtain is wound around the variable curtain take-up roll by manipulation of the control switch so that the upward height of the variable curtain is adjusted.

Further, a first end of the variable curtain is supported elastically in the upward direction by a resilient roll provided on the shade bar wherein the variable curtain can be pulled downward by a predetermined length by manipulation of the control switch so that the upward height of the variable curtain is adjusted.

Therefore, the mesh portion of the variable curtain pulled downward by the predetermined length can be overlapped with the shading portion of the fixed curtain.

In accordance with another aspect of the present invention, various aspects of the present invention are directed to providing a door curtain assembly configured for adjusting shading amount, including a fixed curtain having a top end coupled to a shade bar, the fixed curtain being wound around a fixed curtain take-up roll; a variable curtain having a top end coupled to the shade bar, the variable curtain being wound around a variable curtain take-up roll; and the shade bar to which a top end of the fixed curtain is fixedly coupled and by which a top end of the variable curtain is elastically supported, wherein the variable curtain is in a state that it is partially wound around the shade bar unless external force is applied thereto.

Furthermore, the door curtain assembly further includes a control switch provided on a door trim, wherein external force in the downward direction can be exerted to the variable curtain by forcing the variable curtain take-up roll to rotate by manipulation of the control switch.

The fixed curtain and the variable curtain are formed respectively as a double structure in which a mesh portion allowing light to pass therethrough and a shading portion for shading light are formed alternately one after another.

Furthermore, the mesh portion of the fixed curtain and the mesh portion of the variable curtain have a same width while the shading portion of the fixed curtain and the shading portion of the variable curtain have a same width.

Consequently, the mesh portion of the variable curtain and the shading portion of the fixed curtain are overlapped with each other when no external force is applied to the variable curtain.

Furthermore, the mesh portion of the variable curtain and the mesh portion of the fixed curtain are overlapped with each other by manipulation of the control switch.

The door curtain assembly configured for adjusting shading amount according to an exemplary embodiment of the present invention allows a driver and occupants to select either a complete shading or a half shading as necessary by the fixed and variable curtains which are of a double structure respectively, so that convenience of the driver and occupants is facilitated.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
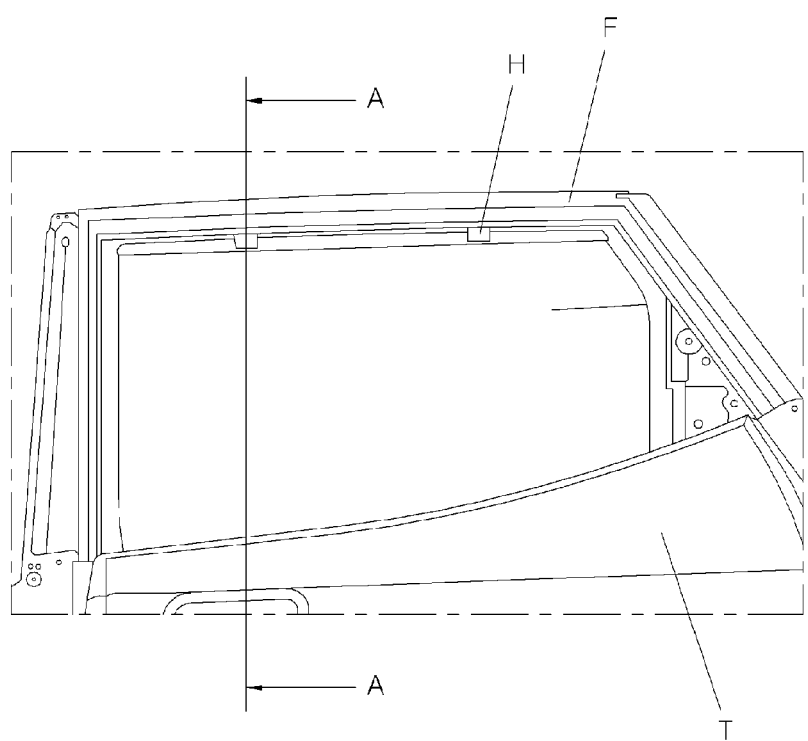
FIG. 1 is a view illustrating a window glass and its peripheral configuration to which a door curtain assembly configured for adjusting shading amount according to an exemplary embodiment of the present invention is applied.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In describing the exemplary embodiments, detailed description of technology known in the art or iterative description may be made shortly or omitted to avoid obscuring the subject matter of the present invention.

Figure 2:
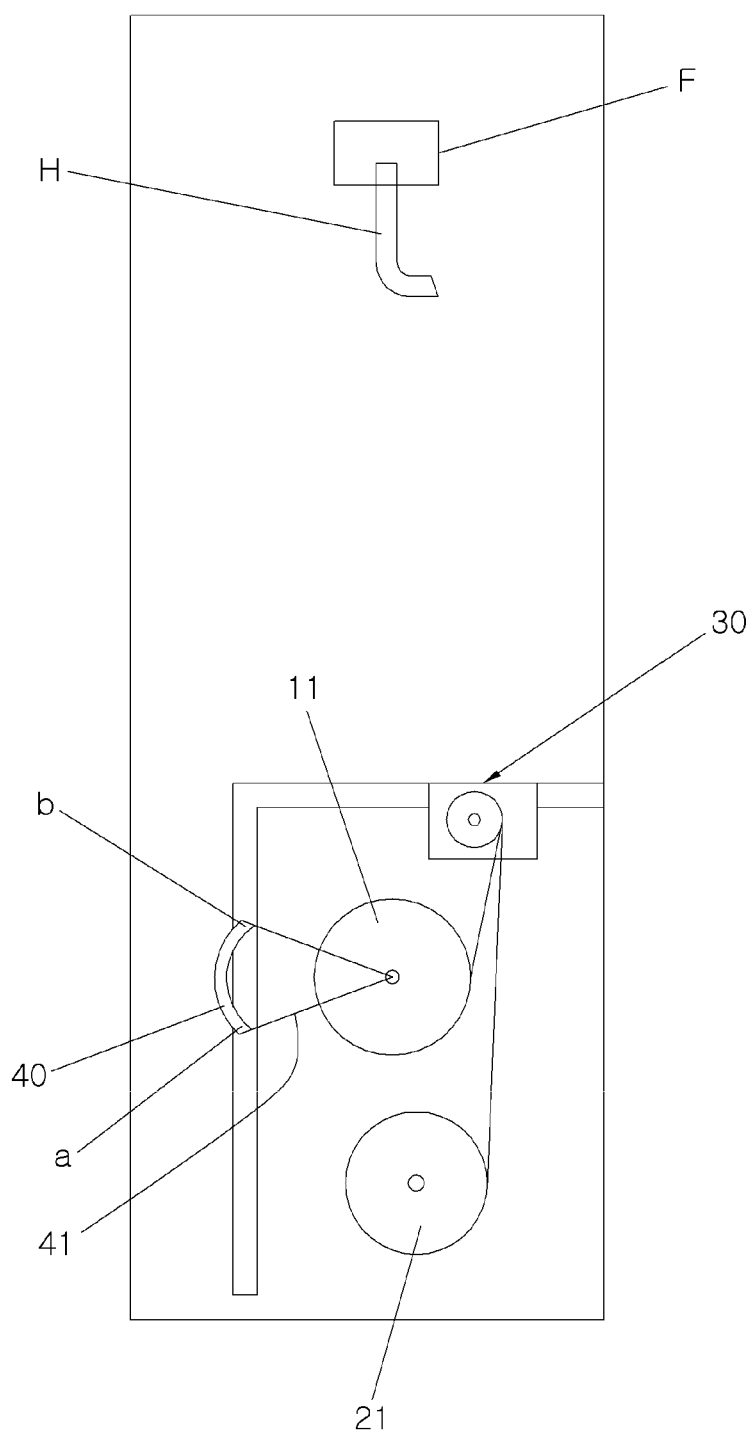
FIG. 2 is a cross-sectional view taken from a section line A-A of FIG. 1.
Figure 3:
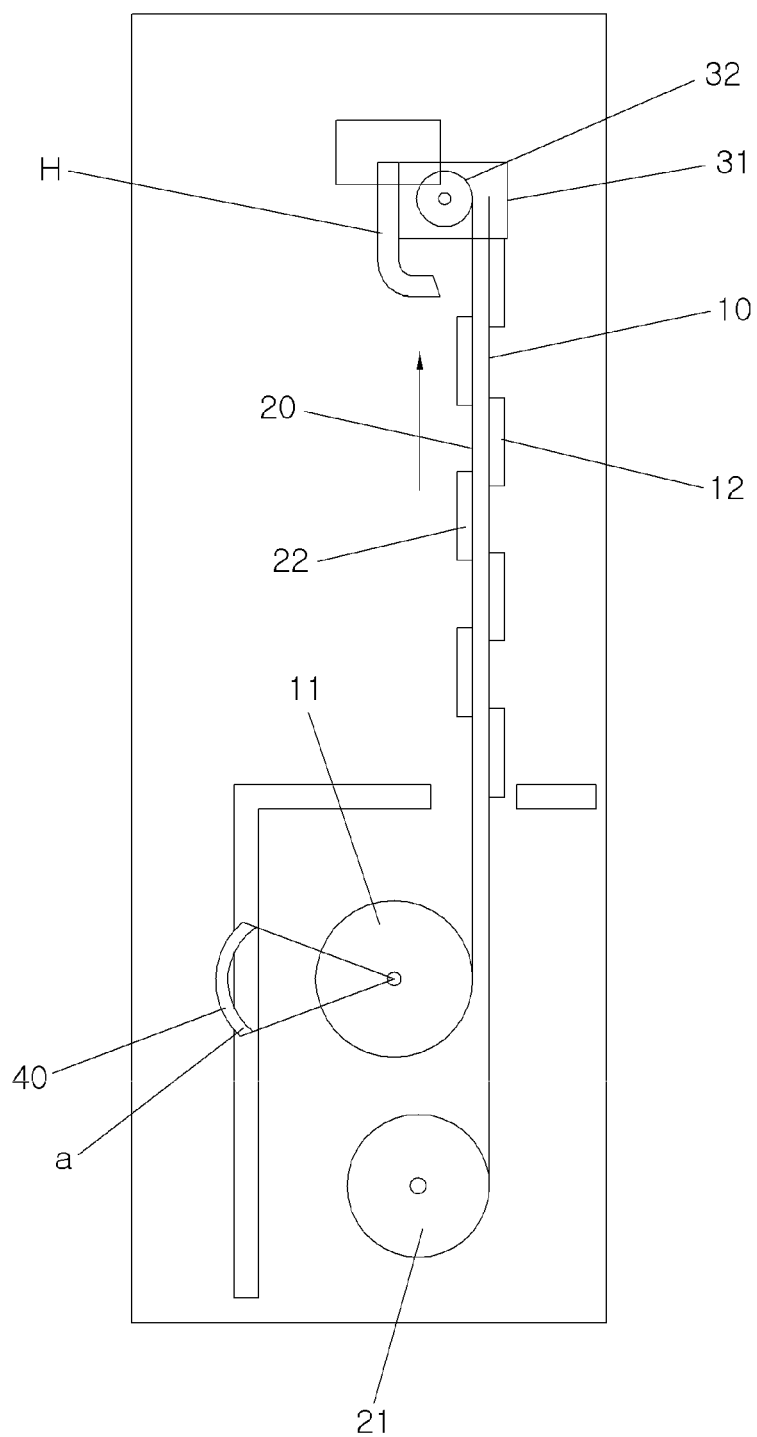
FIG. 3 is a view illustrating on the basis of FIG. 2. a state that a door curtain assembly configured for adjusting shading amount according to an exemplary embodiment of the present invention is applied.
Figure 4:
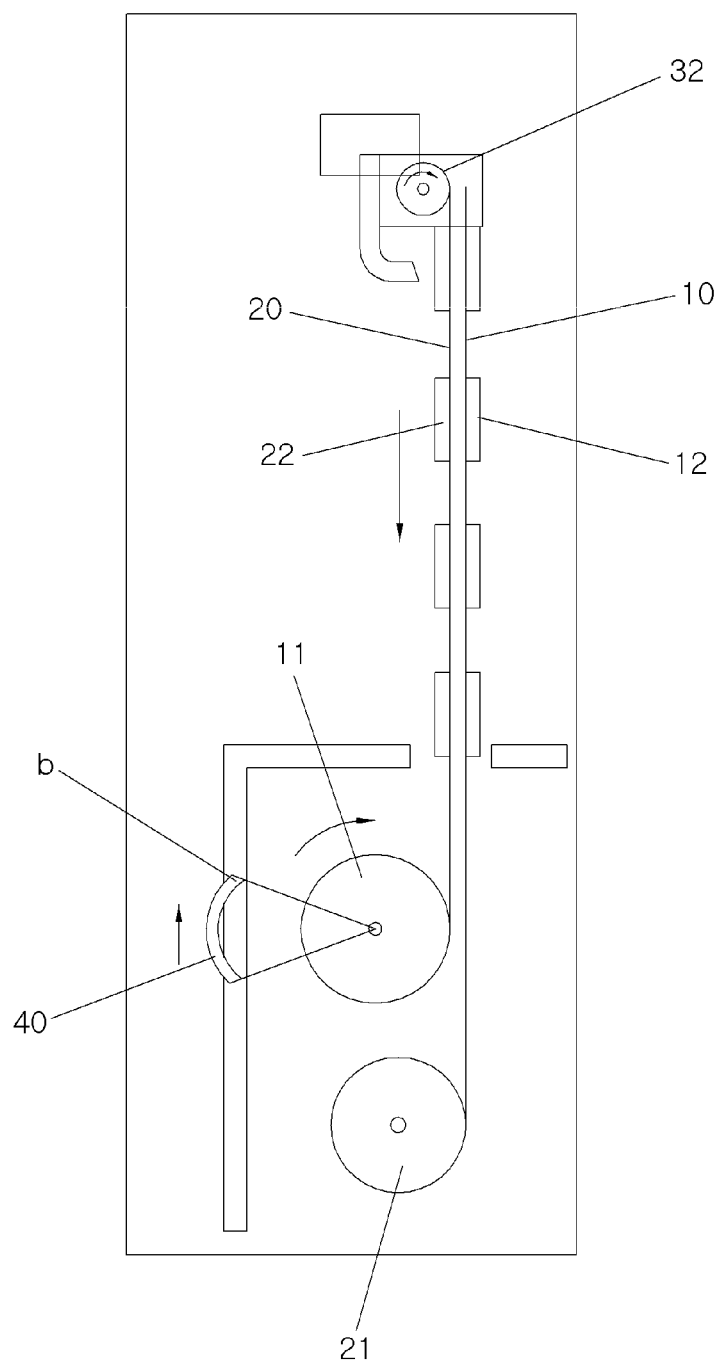
FIG. 4 is a view illustrating on a basis of FIG. 2 an operating state of a door curtain assembly configured for adjusting shading amount according to an exemplary embodiment of the present invention.

FIG. 1 is a view illustrating a window glass and its peripheral configuration to which a door curtain assembly configured for adjusting shading amount according to an exemplary embodiment of the present invention is applied, FIG. 2 is a cross-sectional view taken from a section line A-A of FIG. 1, FIG. 3 is a view illustrating on the basis of FIG. 2 a state that a door curtain assembly configured for adjusting shading amount according to an exemplary embodiment of the present invention is applied, and FIG. 4 is a view illustrating on the basis of FIG. 2 an operating state of a door curtain assembly configured for adjusting shading amount according to an exemplary embodiment of the present invention.

A door curtain assembly configured for adjusting shading amount according to an exemplary embodiment of the present invention will now be described with reference to FIGS. 1 to 4.

A door curtain assembly configured for adjusting shading amount according to one exemplary embodiment of the present invention is an apparatus that is applied to a window glass of a vehicle to block out light wherein some components thereof are mounted in a door trim T and the apparatus operates to pull up a door curtain mounted in the trim door T and then lock the door curtain on a hook H so that light is blocked out.

For this purpose, the door curtain assembly configured for adjusting shading amount includes a fixed curtain 10, a variable curtain 20, a shade bar 30 and a control switch 40.

The door curtain assembly configured for adjusting shading amount according the present invention is configured such that the fixed curtain 10 and the variable curtain 20, each of which is of a double mesh structure including a mesh portion and a shading portion, can be overlapped with each other wherein when the mesh portion of one of the curtains and the shading portion of a second of the curtains are overlapped with each other, a complete shading is obtained whereas when both mesh portions or both shading portions of the curtains are overlapped with each other, a half shading is obtained, so that convenience of a driver and occupants is facilitated.

This fixed curtain 10 wound around a fixed curtain take-up roll 11 and can be unwound from the fixed curtain take-up roll 11 when a top end thereof is pulled up.

Similarly, the variable curtain 20 also wound around a variable curtain take-up roll 21 and can be unwound from the variable curtain take-up roll 21 when a top end of the variable curtain 20 is pulled up.

The fixed curtain take-up roll 11 and the variable curtain take-up roll 21 are mounted so as not to interfere with each other in the door trim T.

The shade bar 30 is provided to pull up the fixed curtain 10 and the variable curtain 20 which are wound around the respective take-up roll.

Both the top ends of the fixed curtain 10 and the variable curtain 20 are coupled to the shade bar 30. When the shade bar 30 is forced to move upward, both the fixed curtain 10 and the variable curtain 20 are unwound and pulled up.

To this end, the shade bar 30 may be configured such that a housing 31 thereof is provided with a knob.

In this case, the shade bar 30 may be configured in a variety of forms, wherein it is sufficient to configure the shade bar in such a manner that the top end of the fixed curtain 10 is fixedly coupled to the shade bar and the top end of the variable curtain 20 is elastically supported by the shade bar.

The shade bar is preferably configured such that elastic force of approximately 20 N (newton) to 30 N depending on door curtains is applied to the variable curtain 20.

By such configuration, it is no longer possible to adjust an upward height of the fixed curtain 10 after it is pulled up, whereas an upward height of the variable curtain 20 can be further adjusted even after it is pulled up.

As an example shown in the drawings, the fixed curtain 10 is coupled to a fixed axis of the housing 31 and the variable curtain 20 is partially wound around a resilient roll 32 in the housing 31 so that the variable curtain cannot be further pulled downward as far as external force is not exerted thereto, wherein when the variable curtain 20 is pulled downward by external force, elastic restoring force exerts upward to the variable curtain 20.

Alternatively, only one cylinder of double cylinders having different axes, to which the variable curtain is coupled, may be configured to have elasticity by its resilient member and be rotatable.

The door curtain is used such that in a state that the door curtain is mounted in the door trim T as shown in FIG. 2, the shade bar 30 is pulled up as shown in FIG. 3 and then the door curtain pulled up is forced to be locked by a fixing means including a hook H mounted at a door frame F. In this context, it is of course possible to add elasticity to both the fixed curtain take-up roll 11 and the variable curtain take-up roll 21 such that the door curtain pulled up can have elastic restoring force in a direction toward the take-up rolls.

The control switch 40 is provided to pull down the variable curtain 20 by a predetermined distance by external force.

The control switch 40 may be provided on the door trim T as a dial type configured for being manipulated by users. As the control switch 40 rotates about the axis of the variable curtain take-up roll 21 after the control switch 40 is manipulated and then a control rod 41 is coupled to the axis of the variable curtain take-up roll 21, the variable curtain take-up roll 21 rotates.

Regarding a direction being wound, manipulating the control switch 40 in a clockwise direction brings the variable curtain take-up roll 21 to wind the variable curtain 20 as shown in the drawings illustrated by way of example.

The switch may be implemented such that manipulation thereof can be made in an analog manner by a dial and thereby the variable curtain 20 can be finely adjusted, or otherwise it is implemented as a type allowing selection of a position "a" and a position "b."

Referring to the latter as a matter of convenience, the position a is a position that the control switch 40 is not manipulated. When the control switch 40 is switched to the position b, the variable curtain take-up roll 21 winds the variable curtain 20 partially and the top end of the variable curtain 20 wound around the resilient roll 32 is partially unwound from the resilient roll, with the result that an upward position of the variable curtain 20 is adjusted.

In other words, as shown in FIG. 3, when the door curtain is pulled up and then the shade bar 30 is locked on the hook H, the shading portion 12 of the fixed curtain 10 and the mesh portion (i.e., portion that is not the shading portion 22) of the variable curtain 20 are overlapped with each other, thereby obtaining a complete shading state that can block out light 90% or more.

From this state, if the control switch 40 is manipulated to be switched from the position a to the position b as shown in FIG. 4, the variable curtain 20 is pulled down by an amount that the top end of the variable curtain has been wound with elastic restoring force exerted to the variable curtain in the upward direction, and hence the shading portion 12 of the fixed curtain 10 and the shading portion 22 of the variable curtain 20 are overlapped with each other and mesh portions of both curtains are also overlapped with each other as shown in FIG. 4, with the result that light is transmitted through portions that the mesh portions are overlapped with each other.

This state is a half shading state that can block out light by approximately 50%.

As noted above, the door curtain assembly configured for adjusting shading amount according to an exemplary embodiment of the present invention can accomplish shading by overlapping the fixed curtain and the variable curtain with each other, which are of a double mesh structure respectively, and is further configured for changing shading amount to a degree of 50%, so that it can satisfy users' needs and hence increase users' satisfaction.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A door curtain assembly configured for adjusting shading amount, the door curtain assembly comprising:
   a fixed curtain wound around a fixed curtain take-up roll mounted at a door trim;
   a variable curtain wound around a variable curtain take-up roll mounted at the door trim;
   a shade bar coupled to both a first end of the fixed curtain and a first end of the variable curtain such that the fixed curtain and the variable curtain are configured to be unwound and pulled up when the shade bar moves upward; and
   a control switch for adjusting an upward height of the variable curtain,
   wherein the fixed curtain is formed as a double structure in which a mesh portion allowing light to pass therethrough and a shading portion for shading light are formed layered alternately one after another,
   wherein the variable curtain is formed as a double structure in which a mesh portion allowing light to pass therethrough and a shading portion for shading light are formed layered alternately one after another,
   wherein the mesh portion of the fixed curtain and the mesh portion of the variable curtain have a same width and wherein the shading portion of the fixed curtain and the shading portion of the variable curtain have a same width,
   wherein the shading portion of the fixed curtain and the mesh portion of the variable curtain are overlapped with each other when the fixed curtain and the variable curtain are unwound completely from the fixed curtain take-up roll and the variable curtain take-up roll respectively and then the shade bar is configured to be locked to the door frame,
   wherein the variable curtain is wound around the variable curtain take-up roll by manipulation of the control switch so that the upward height of the variable curtain is adjusted, and
   wherein the first end of the variable curtain is supported elastically in an upward direction by a resilient roll provided on the shade bar and wherein the variable curtain is configured to be pulled downward by a predetermined length by manipulation of the control switch so that the upward height of the variable curtain is adjusted.

2. The door curtain assembly according to claim 1, wherein the mesh portion of the variable curtain pulled downward by the predetermined length is overlapped with the mesh portion of the fixed curtain.

3. A door curtain assembly configured for adjusting shading amount, the door curtain assembly comprising:
   a fixed curtain wound around a fixed curtain take-up roll mounted at a door trim;
   a variable curtain wound around a variable curtain take-up roll mounted at the door trim;
   a shade bar coupled to both a first end of the fixed curtain and a first end of the variable curtain such that the fixed curtain and the variable curtain are configured to be unwound and pulled up when the shade bar moves upward; and
   a control switch for adjusting an upward height of the variable curtain,
   wherein the fixed curtain is formed as a double structure in which a mesh portion allowing light to pass therethrough and a shading portion for shading light are formed layered alternately one after another,
   wherein the variable curtain is formed as a double structure in which a mesh portion allowing light to pass therethrough and a shading portion for shading light are formed layered alternately one after another,
   wherein the mesh portion of the fixed curtain and the mesh portion of the variable curtain have a same width and wherein the shading portion of the fixed curtain and the shading portion of the variable curtain have a same width,
   wherein the mesh portion of the fixed curtain and the mesh portion of the variable curtain are overlapped with each other when the fixed curtain and the variable curtain are unwound completely from the fixed curtain take-up roll and the variable curtain take-up roll respectively and then the shade bar is locked to the door frame,
   wherein the variable curtain is wound around the variable curtain take-up roll by manipulation of the control switch so that the upward height of the variable curtain is adjusted, and
   wherein the first end of the variable curtain is supported elastically in an upward direction by a resilient roll provided on the shade bar and wherein the variable curtain is configured to be pulled downward by a predetermined length by manipulation of the control switch so that the upward height of the variable curtain is adjusted.

4. The door curtain assembly according to claim 3, wherein the mesh portion of the variable curtain pulled downward by the predetermined length is overlapped with the shading portion of the fixed curtain.

* * * * *